United States Patent [19]

Hararat-Tehrani

[11] Patent Number: 4,957,250
[45] Date of Patent: Sep. 18, 1990

[54] DEVICE FOR INTERCEPTING AND RETAINING OF CARGO IN A TRANSPORT CABIN

[75] Inventor: Mohammad Hararat-Tehrani, Bremen, Fed. Rep. of Germany

[73] Assignee: Messerschmitt-Boelkow-Blohm GmbH, Munich, Fed. Rep. of Germany

[21] Appl. No.: 390,622

[22] Filed: Aug. 7, 1989

[30] Foreign Application Priority Data

Aug. 11, 1988 [DE] Fed. Rep. of Germany ....... 3827278

[51] Int. Cl.⁵ .............................................. B64D 1/10
[52] U.S. Cl. .................................. 244/118.1; 410/118; 410/129; 410/154; 244/121
[58] Field of Search .................. 244/118.1, 118.5, 119, 244/121; 410/118, 122, 123, 129, 130, 154; 188/374

[56] References Cited

U.S. PATENT DOCUMENTS

| | | | |
|---|---|---|---|
| 2,196,470 | 4/1940 | Montgomery | 410/154 |
| 2,601,935 | 2/1952 | Auch | 410/123 |
| 2,669,402 | 2/1954 | Del Mar | 410/118 |
| 2,894,462 | 7/1959 | Newcomer et al. | 410/122 |
| 3,308,908 | 3/1967 | Bunn | 188/374 |
| 3,336,069 | 8/1967 | Bay et al. | 410/118 |
| 3,354,839 | 11/1967 | Lich et al. | 410/129 |
| 3,779,173 | 12/1973 | Pierce | 410/122 |
| 4,185,799 | 1/1980 | Richards | 410/130 |
| 4,780,034 | 10/1988 | Skotte | 410/129 |

FOREIGN PATENT DOCUMENTS

| | | | |
|---|---|---|---|
| 237262 | 9/1960 | Australia | 410/118 |
| 2649991 | 5/1978 | Fed. Rep. of Germany . | |
| 2913050 | 10/1980 | Fed. Rep. of Germany . | |

Primary Examiner—Galen Barefoot
Attorney, Agent, or Firm—W. G. Fasse; D. H. Kane, Jr.

[57] ABSTRACT

A device for intercepting and retaining of cargo that may have become loose in a transport or baggage compartment or cabin of an aircraft, is located between a freight compartment and a passenger compartment of an aircraft. The device forms an additional protective screen or wall connected to a mounting structure by connection flanges, e.g. the air frame or cabin structures such as the floor and ceiling. The protective screen has at least two wall sections arranged one behind the other with a spacing between the wall sections. The wall sections are joined to each other by energy absorbing elements inserted in the spacing to form a composite, laminated structure. Each wall section has an external covering. The passenger cabin facing wall section may have a decorated surface. The baggage compartment facing wall has a tough material covering to take up impacts, when a piece of cargo should hit the wall surface.

10 Claims, 3 Drawing Sheets

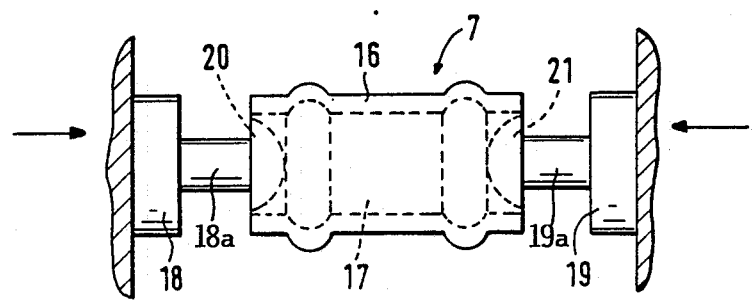
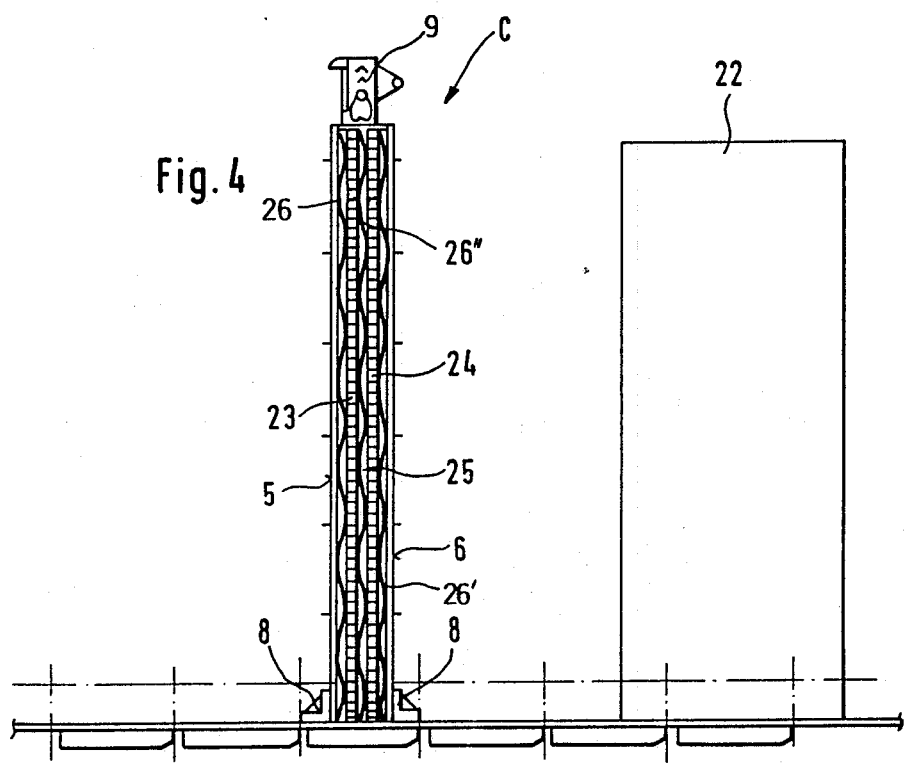

DEVICE FOR INTERCEPTING AND RETAINING OF CARGO IN A TRANSPORT CABIN

FIELD OF THE INVENTION

The invention relates to a device for intercepting and retaining pieces of cargo, such as baggage that has become loose in a transport cabin set aside for holding pieces of baggage, for example, in an aircraft. The device separates the transport cabin or compartment of a vehicle, in particular an aircraft, from a freight or cargo hold and from a passenger compartment. The device forms a protective screen that is connected by mounting flanges to a mounting member forming part of the vehicle structure, for example, the air frame.

BACKGROUND INFORMATION

Vehicle partitions that are longitudinally movable to a limited extent and which are lockable by means of a locking arrangement, are known from German Patent Publication No. (DE-OS) 2,649,991. The walls that close off the ends of the transport compartment are braced against the end wall of the vehicle by shock absorbers.

German Patent Publication No. (DE-OS) 2,913,050 discloses an arrangement, comprising a net for retaining of cargo. The net is located between a cargo hold and the cockpit of an aircraft. In a position ready for use the net is arranged in a vertical plane in the fuselage. The net is fixed to the fuselage of the aircraft by elastic straps and connecting hardware so that it is detachable. Such an arrangement requires a relatively large free space behind the net for intercepting and holding freight items, whereby the area of the passenger compartment or cabin is substantially decreased.

OBJECTS OF THE INVENTION

In view of the foregoing it is the aim of the invention to achieve the following objects singly or in combination:

to provide a retaining device for the holding up of cargo pieces, such as containers or the like, by means of a protective screen requiring but a small space for its own installation;
the device shall be capable of absorbing the acceleration energy of the load or rather cargo pieces over the shortest possible path;
the device shall itself be lightweight, yet take up impacts efficiently; and
the device shall itself separate the cockpit from a transport cabin substantially without any lost space.

SUMMARY OF THE INVENTION

These objects have been achieved, according to the invention, by a cargo intercepting and retaining device constructed as a protective screen comprising at least two walls arranged one behind the other, which are joined to each other by energy absorbing elements inserted between the two walls to form a composite structure, and wherein each protective screen comprises an external covering on one side forming an impact resistant wall section or surface and a decorated interior cabin wall section on the other side.

Other advantageous features are described in the dependent claims.

The advantages achieved by the invention are seen in that structural connections between the screen and the air frame can be laid out much weaker than heretofore, due to the energy absorption by the present protective screen, and in that a considerable weight reduction is brought about. The protective screen can be anchored by mounting hardware, to the air frame while requiring a relatively small space, yet corresponding to any particular requirements. A free space behind the protective screen is no longer necessary, so that mounting directly to the cockpit wall is possible, whereby this protective screen can directly separate the cargo or freight or baggage compartment from the passenger compartment.

The combination of mechanical friction dampers arranged between energy absorbing walls increases the energy absorption without necessitating a substantially larger space for the device.

BRIEF DESCRIPTION OF THE DRAWINGS

In order that the invention may be clearly understood, it will now be described, by way of example, with reference to the accompanying drawings, wherein:

FIG. 3 is a friction damper for use in the protective screen of the invention;

FIG. 4 shows another embodiment of a protective screen comprising two wall sections having a honeycomb structure with interposed inserts forming a sandwich-like structure;

DETAILED DESCRIPTION OF PREFERRED EXAMPLE EMBODIMENTS AND OF THE BEST MODE OF THE INVENTION

Figure 1:
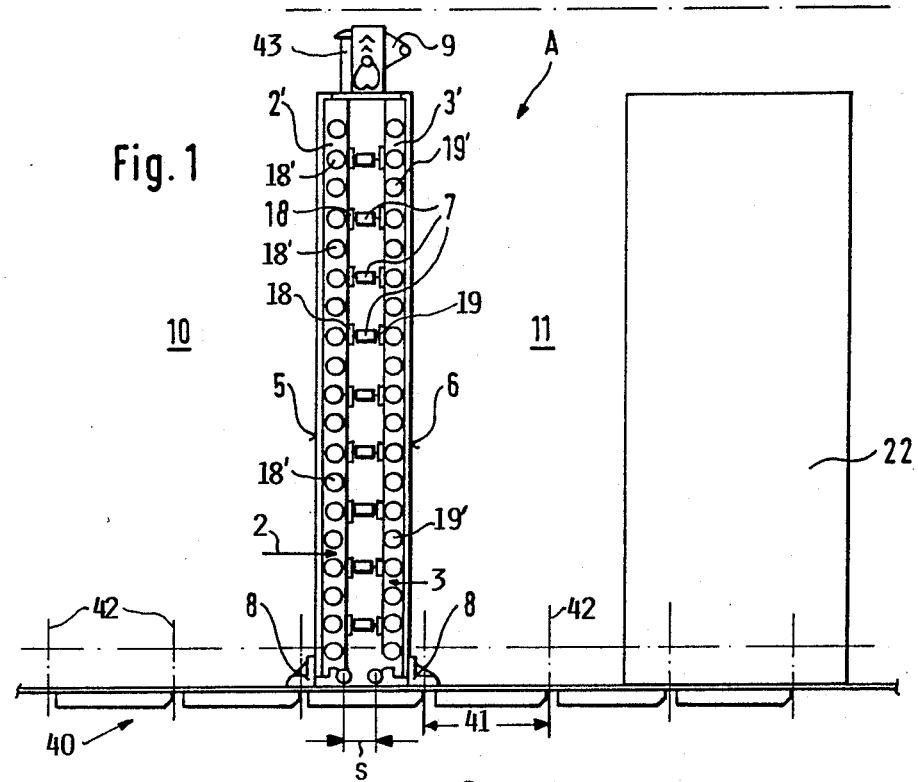
FIG. 1 shows a protective screen comprising two wall sections with integrated friction dampers between the wall sections.

The example embodiment of a protective screen A, FIG. 1, comprises at least two wall sections 2 and 3 arranged one behind the other. As can be seen in the further embodiments of FIGS. 2, 4, and 5, these wall sections have various constructions. The wall sections themselves are equipped with integrated energy absorbing elements and/or separate energy absorbing elements, such as mechanical friction energy absorbers, and are provided between the wall sections.

According to FIG. 1, wall sections 2 and 3 are assembled of several I-beams 2' and 3' shown schematically. The wall surface facing the passenger compartment 10 is covered with a decorated wall section 5 and the opposite wall surface, facing the freight cabin or compartment 11, is connected to a wall section 6 constructed to take up impacts.

A spacing "s" is provided between the inwardly facing chords of the I-beams 2', 3' so that the wall sections 2 and 3 are arranged one behind the other. Friction energy absorbers 7 are inserted in the spacing "s". Flanges 18, 19 of the energy absorbers 7 rest centrally against inwardly facing chords of the I-beams. The webs of the I-beams have openings 18', 19' for a lightweight construction. The webs of the I-beams extend substantially in parallel to an impact direction, whereby a longitudinal axis of the energy absorbers 7 aligns with the web of the respective I-beam.

The protective screen A with its wall sections 2, 5; 3, 6 and with its energy absorbers 7 forms an integral unit connected at its foot 1 by flanges or brackets 8 with the floor 40. The upper wall end 43 is secured by brackets 9 with the ceiling or parts of the fuselage not shown. The flanges or brackets 8 are spaced from each other in accordance with a standardized spacing 41. The floor 40 is provided with conventional connecting means such as threaded holes shown symbolically at 42 and spaced at said spacing 41 for receiving threaded bolts to hold down the flanges or brackets 8. Thus, the wall section can be installed in different positions to make the compartment 11 larger or smaller as needed. A piece of baggage is shown at 22. Holes, not shown, in the ceiling or cabin side walls are also spaced at said standardized spacing 41 for securing the bracket 9.

Figure 2:
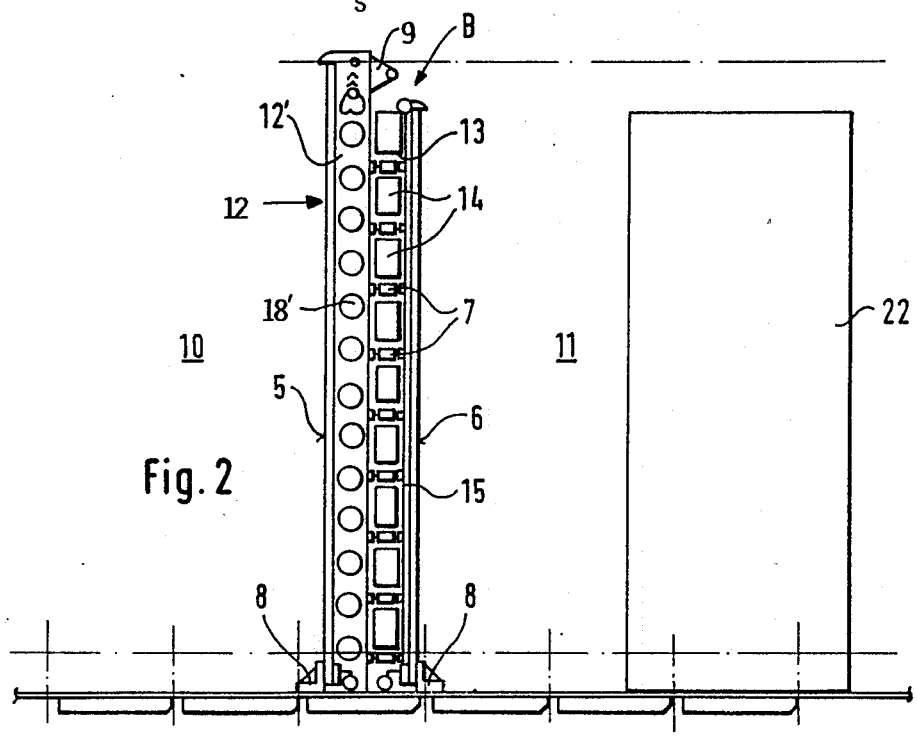
FIG. 2 depicts a combined protective screen comprising I-beams and an integral foam structure with integrated friction dampers.

FIG. 2 shows a further embodiment of a protective screen B comprising a first wall section 12 made of I-beams 12' facing the passenger compartment 10 and a second wall section 13. The wall section 12 is externally connected to or covered with a decorated wall section 5. The second wall section 13 comprises an integral foam structural element with box-shaped recesses 14 or integral boxes, the outwardly facing sides of which are connected to the wall section 6 for taking up impacts. The friction energy absorbers 7 are arranged between the two wall sections 12 and 13. The friction energy absorbers 7 are stressed under pressure and on one side they rest on the I-beams, while on the other side they rest on the abutting wall section 6 or on a wall member 15 that completes the screen B. Openings 18' in the webs of the I-beams 12' reduce the weight.

As shown in FIG. 3, the friction energy absorbers 7 essentially comprises a cylinder 16 with a bore 17. When pressure is applied to the flanges 18 and 19, ball ends 20, 21 connected to said flanges 18, 19 by rods 18a, 19a are forced into the bore 17 of the cylinder 16, whereby the bore 17 is widened. For this purpose, the internal diameter of the bore is smaller than the external diameter of the ball ends 20, 21, so that under compression stress in the direction of the arrows, the kinetic energy of a falling container 22 is absorbed through the application of frictional energy.

FIG. 4 shows a further example embodiment of a protective screen C having two wall sections 23, 24 constructed as honeycomb structures arranged one behind the other with a space 25 therebetween. A corrugated element 26" is inserted in the space 25 so that the corrugated element 26" is sandwiched between the wall sections 23 and 24. A further corrugated element 26 is sandwiched between the decorated wall section 5 and the one wall section 23. Another corrugated element 26' is sandwiched between the abutting wall section 6 and the other wall section 24. The elements 26, 26', and 26" cooperate with the wall sections 23, 24 and with the wall sections 5 and 6 in an energy absorbing fashion. The corrugated elements 26, 26', 26" may, for example, be made of spring elastic material such as sheet metal.

Figure 5:
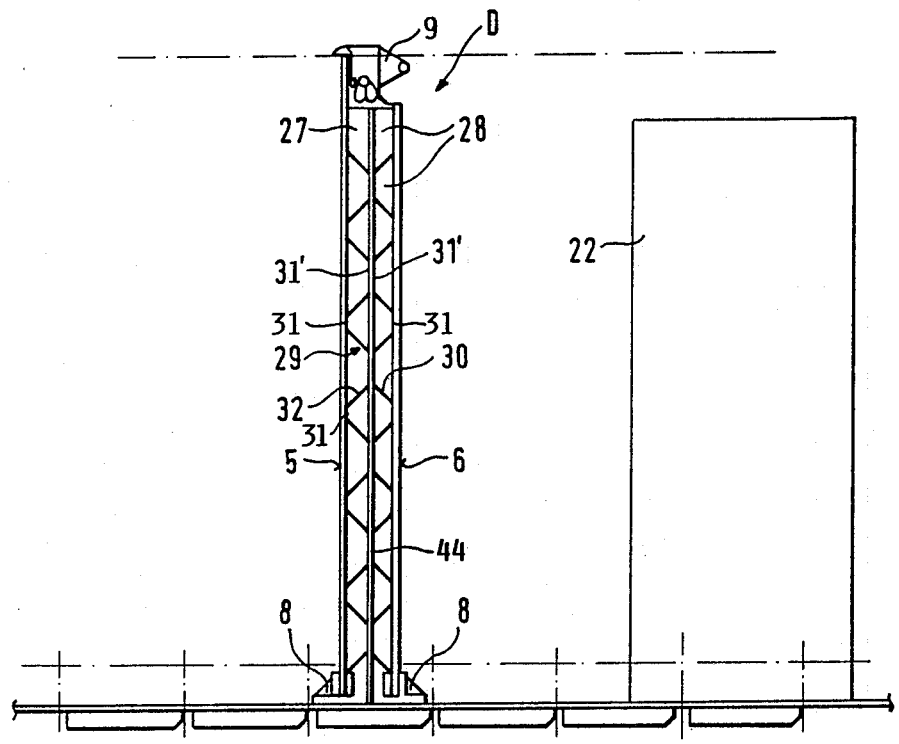
FIG. 5 is a protective screen with two walls that comprise corrugated plates of which the contour elements rest on one another.
Figure 6:
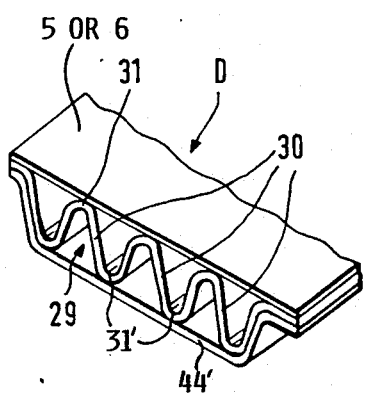
FIG. 6 is a perspective example of the contour elements for such a wall or screen.

FIGS. 5 and 6 illustrate a further example embodiment of a protective screen D comprising two wall sections 27 and 28 in a sandwichtype construction. The screen D comprises a corrugated sheet metal plate 29 (FIG. 6) that extends vertically, whereby the ridges 31 and valleys 31' of the corrugations extend horizontally. Thus, an energy absorbing sandwich structure is formed. In the crosssection, the corrugated plate 29 of each wall section 27, 28 comprises U-shaped elements 30 arranged in a row and interconnected by webs 32. The ridges 31 bear or rest against the outer wall section 5 or 6 respectively. The valleys 31' rest or bear against an intermediate wall section 44 which may be provided as a chord for both sections 27, 28. However, each section may have its own inner chord 44' shown in FIG. 6. The connections between the ridges 31 and walls 31' and the respective wall sections 5, 6 may be accomplished by spot welding, adhesive bonding, or the like. The wall section 27 is covered by the decorated wall section 5. The wall section 28 is covered with the impact take-up wall section 6.

Although the invention has been described with reference to specific example embodiments, it will be appreciated that it is intended to cover all modifications and equivalents within the scope of the appended claims.

What I claim is:

1. A device for separating in a vehicle a space for cargo and for retaining cargo in said space, comprising at least two individual wall sections, energy absorbing elements arranged between and connected to said individual wall sections, one of said wall sections having a first outer surface suitable to face a cabin in said vehicle, another of said wall sections having a second outer surface suitable for taking-up impacts, wherein one of said two individual wall sections comprises I-beams while the other wall section comprises an integral foam material structure, and wherein said energy absorbing elements comprise mechanical mechanical friction energy absorbers responsive to compression loads, said friction energy absorbers being inserted between inwardly facing chords of said I-beams and said foam material structure.

2. The device of claim 1, wherein said first surface is a decorated surface and wherein said second surface comprises an impact resistant surface cover.

3. The device of claim 1, wherein said I-beams are arranged to face a passenger cabin and wherein said foam material structure is arranged to face said space for cargo.

4. The device of claim 1, wherein said I-beams have a passenger cabin facing surface that is decorated and wherein said foam material structure has a cargo space facing surface or cover wall that is impact resistant.

5. The device of claim 1, wherein said foam material structure of said other wall section comprises box-shaped recesses.

6. A device for separating in a vehicle a space for cargo and for retaining cargo in said space, comprising at least two individual wall sections, mechanical friction energy absorbers responsive to compression loads for taking up impact energy, said friction energy absorbers being arranged between and connected to said individual wall sections, one of said wall sections having a first outer surface suitable to face a cabin in said vehicle, another of said wall sections having a second outer surface suitable for taking-up impacts, wherein each of said wall sections comprises I-beams, each I-beam having an I-beam web arranged so that the I-beam webs are extending substantially in parallel to an impact direction, and wherein inner chords of said I-beams facing each other are spaced from each other at a spacing in which said energy absorbing elements are arranged.

7. The device of claim 6, wherein said I-beams have perforations in said I-beam webs for a lightweight construction.

8. The device of claim 6, wherein said first surface is a decorated surface and wherein said second surface comprises an impact resistant surface cover.

9. The device of claim 6, wherein said mechanical friction energy absorbers have a longitudinal central axis extending in alignment with each web of said I-beams in said two individual wall sections.

10. A device for separating in a vehicle a space for cargo and for retaining cargo in said space, comprising at least two individual wall sections, energy absorbing elements arranged between and connected to said individual wall sections, one of said wall sections having a first outer surface suitable to face a cabin in said vehicle, another of said wall sections having a second outer surface suitable for taking-up impacts, wherein said wall sections comprise a first outer wall section (5), a first inner wall section (23) having a honeycomb structure, a first intermediate corrugated wall section (26) sandwiched between said first outer wall section (5) and said first inner wall section (23) to form a first sandwich structure, a second outer wall section (6), a second inner wall section (24) also having a honeycomb structure, a second intermediate corrugated wall section (26') sandwiched between said second outer wall section (6) and said second inner wall section to form a second sandwich structure, and a third corrugated wall section (26") sandwiched between said first and second sandwich structures to form a third sandwich structure with said third corrugated wall section (26") between said first (23) and second (24) honeycomb wall sections, wherein said three sandwich structures form said energy absorbing elements which extend perpendicularly to an impact direction.

* * * * *